(12) United States Patent
Kulkarni et al.

(10) Patent No.: US 9,798,607 B1
(45) Date of Patent: Oct. 24, 2017

(54) SYSTEM AND METHOD FOR SMART ERROR HANDLING MECHANISM FOR AN APPLICATION

(71) Applicant: EMC IP Holding Company LLC, Hopkinton, MA (US)

(72) Inventors: Gururaj Kulkarni, Bangalore (IN); Divya Nagaraj, Bangalore (IN); Soumya Gupta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

(21) Appl. No.: 14/755,331

(22) Filed: Jun. 30, 2015

(51) Int. Cl.
*G06F 11/07* (2006.01)

(52) U.S. Cl.
CPC ........ *G06F 11/079* (2013.01); *G06F 11/0751* (2013.01); *G06F 11/0787* (2013.01)

(58) Field of Classification Search
CPC ... G06F 11/0766; G06F 11/321; G06F 11/327
USPC .......................................................... 714/57
See application file for complete search history.

(56) References Cited

U.S. PATENT DOCUMENTS

| | | | | |
|---|---|---|---|---|
| 6,381,736 B1* | 4/2002 | Klotz | .................. | G06F 11/3624 714/E11.209 |
| 6,401,217 B1* | 6/2002 | Clark | .................. | G06F 11/0751 714/15 |
| 6,948,094 B2* | 9/2005 | Schultz | ............... | G06F 11/0772 714/15 |
| 8,209,567 B2* | 6/2012 | Cohen | .................. | G06F 11/3476 714/26 |
| 9,477,570 B2* | 10/2016 | DeHaan | ................ | G06F 11/302 |
| 2003/0056155 A1* | 3/2003 | Austen | ................ | G06F 11/0781 714/45 |
| 2005/0015668 A1* | 1/2005 | Doyle | ................... | G06F 11/079 714/25 |
| 2005/0138486 A1* | 6/2005 | Gromyko | ............... | G06Q 10/10 714/49 |
| 2005/0144526 A1* | 6/2005 | Banko | ................. | G06F 11/0706 714/38.12 |
| 2011/0170667 A1* | 7/2011 | Ruggiero | ............... | A61B 6/586 378/98.5 |
| 2011/0185234 A1* | 7/2011 | Cohen | ................. | G06F 11/3476 714/37 |
| 2014/0373136 A1* | 12/2014 | Igelka | ................. | H04L 63/1441 726/22 |
| 2015/0026335 A1* | 1/2015 | Ladd | .................... | G06F 11/2268 709/224 |

(Continued)

*Primary Examiner* — Chae Ko
(74) *Attorney, Agent, or Firm* — Stanford Tomita LLP

(57) ABSTRACT

An error guide including a set of error resolutions is stored. A set of log files is received which includes log entries generated by a set of processes associated with an application program. Each log entry includes a set of attributes including a first attribute specifying a message, a second attribute specifying a message identifier, a third attribute specifying process, and a fourth attribute specifying a message type. The log files are parsed based on the third and fourth attributes to identify a log entry associated with a particular process and message type. A message identifier of the log entry is compared with the error message guide to identify an error resolution that corresponds to a message of the log entry. The identified error resolution is displayed on an electronic screen.

12 Claims, 10 Drawing Sheets

(56) References Cited

U.S. PATENT DOCUMENTS

2015/0242431 A1* 8/2015 Vlcek ................... G06Q 50/01
  707/753
2015/0347923 A1* 12/2015 Bartley ................ G06F 11/079
  706/12
2016/0224401 A1* 8/2016 Adinarayan .......... G06F 11/079

* cited by examiner

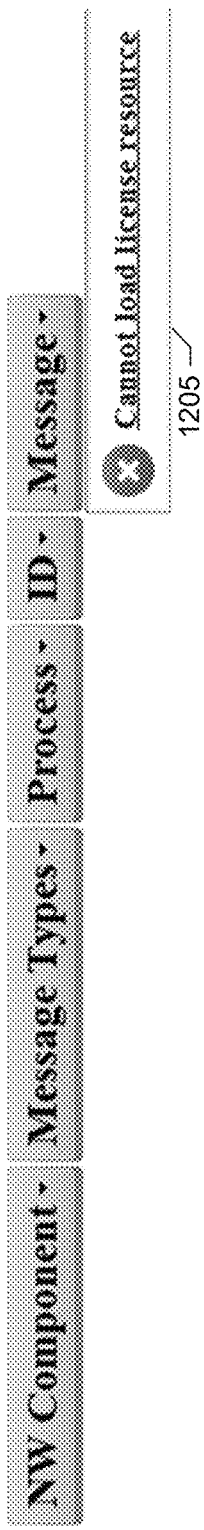
FIG. 12
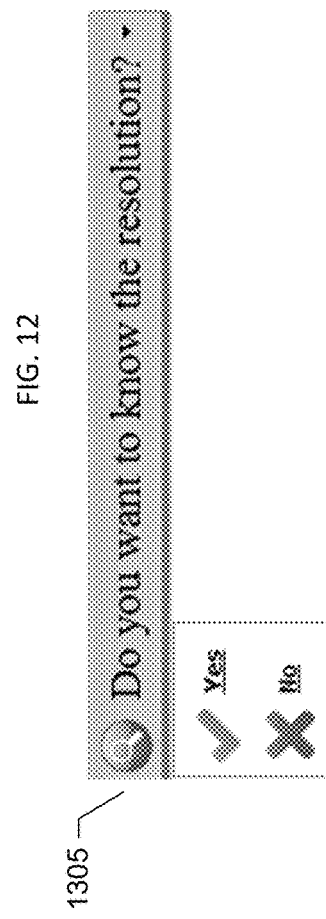
FIG. 13
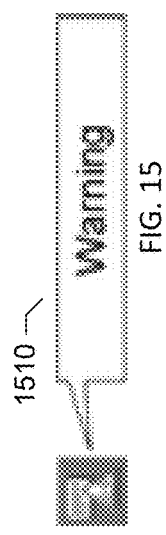
FIG. 14
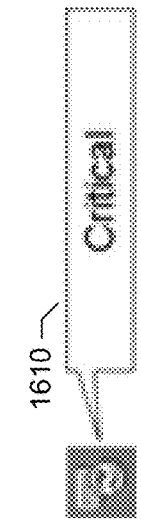
FIG. 15
FIG. 16
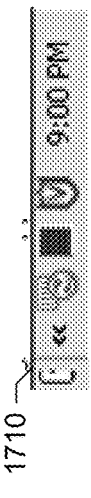
FIG. 17

SYSTEM AND METHOD FOR SMART ERROR HANDLING MECHANISM FOR AN APPLICATION

TECHNICAL FIELD

The present invention relates generally to the field of data management, and, more particularly, to handling error messages generated by an application program.

BACKGROUND

Application programs typically include message logging engines which log messages related to the operation of the application program. A complex application may include many modules and processes distributed across many separate machines, each of which may be generating a log file. Thus, there can be many dozens or even hundreds of log files or more depending upon the size of the computing environment in which the application is deployed. A single log file may include thousands upon thousands of entries.

Because of the vast number of messages that may be logged by different components and processes of the application, it can be very difficult for a user to inspect and review the log files in order to discover and diagnose problems related to the application. For example, critical error messages may be buried in a log file alongside many thousands of other messages that are merely informational.

Thus, there is a need to provide systems and techniques for managing messages in log files.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 12 shows an example of a screen shot of a fifth step of the sequence for selecting log filter criteria.

FIG. 13 shows an example of a screen shot of a sixth step of the sequence for selecting log filter criteria.

FIG. 14 shows an example of an icon that may be associated with an informational message.

FIG. 15 shows an example of an icon that may be associated with a warning message FIG. 16 shows an example of an icon that may be associated with a critical message FIG. 17 shows an example of taskbar that may display icons associated with the log messages.

DETAILED DESCRIPTION

Figure 1:
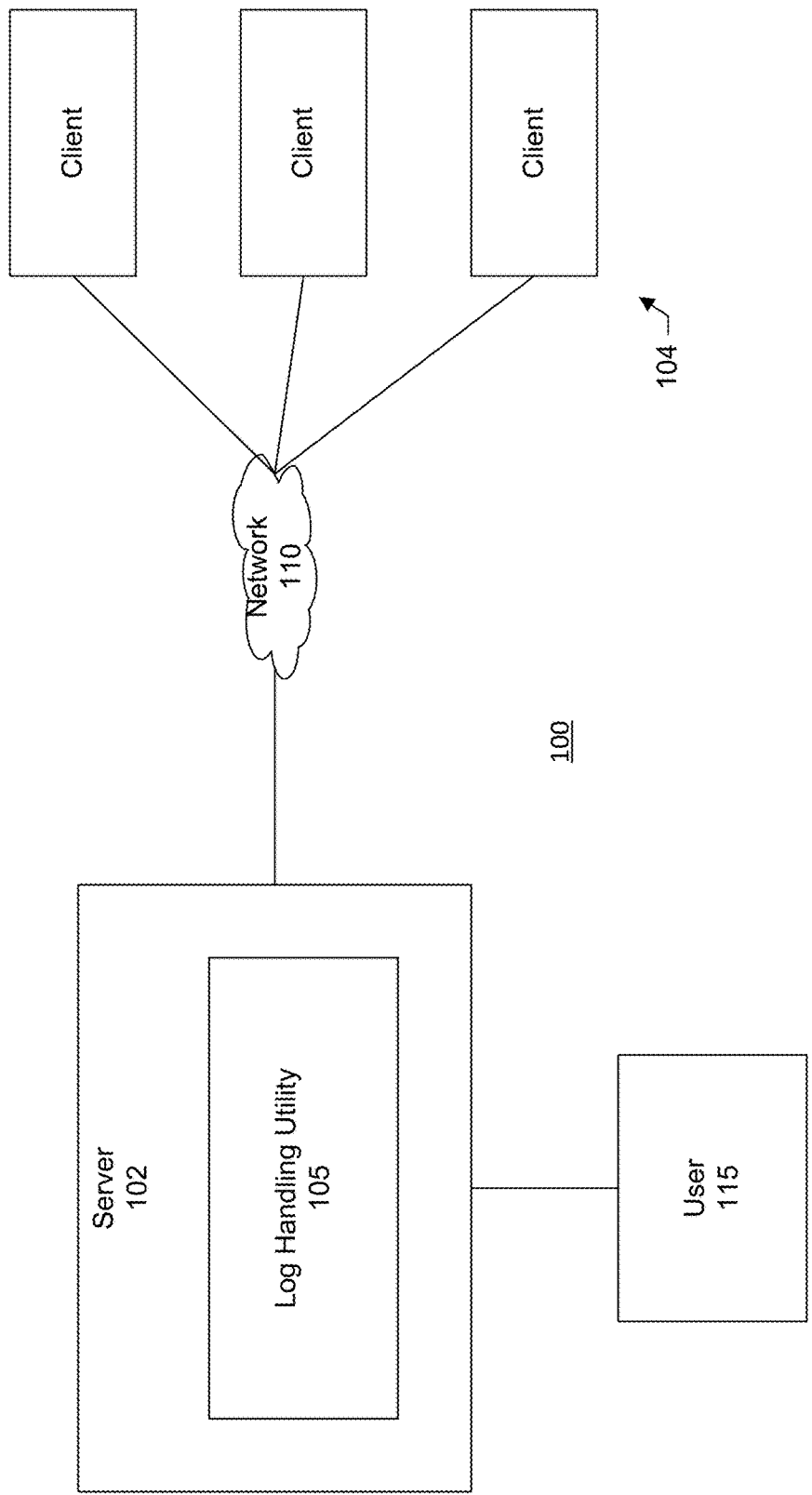
FIG. 1 is a diagram of a large-scale network implementing a log handling utility, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for handling error logs. Some embodiments of the invention involve handling error logs for a backup and recovery application in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks), and other applications which generate error logs. Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for handling error logs. In system 100, any number of various computing nodes are coupled directly or indirectly through a network 110. For example, there can be a number of clients 104 and a network server computer 102 that is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in any number of persistent storage locations and devices, such as local client storage, server storage, or network storage, which may at least be partially implemented through storage device arrays, such as RAID components. In an embodiment network 110 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes a server 102, and one or more clients 104, each of which host one or more components of an application program. The components generate logs which are handled by a log handling utility 105 at server 102. A user 115 may interact with the log handling utility through a graphical user interface (GUI). The log handling utility helps with the management, analysis, and monitoring of the logs.

In an embodiment, system 100 includes a backup application program that may be referred to as NetWorker as provided by EMC Corporation and may integrate with a Data Domain-based deduplication storage system provided by EMC Corporation. For example, the backup storage server may include an EMC Data Domain Server. Data Domain Server is a disk based de-duplication system having built-in intelligence. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files. DD Boost is a high-speed client-side data de-duplication system.

Figure 2:
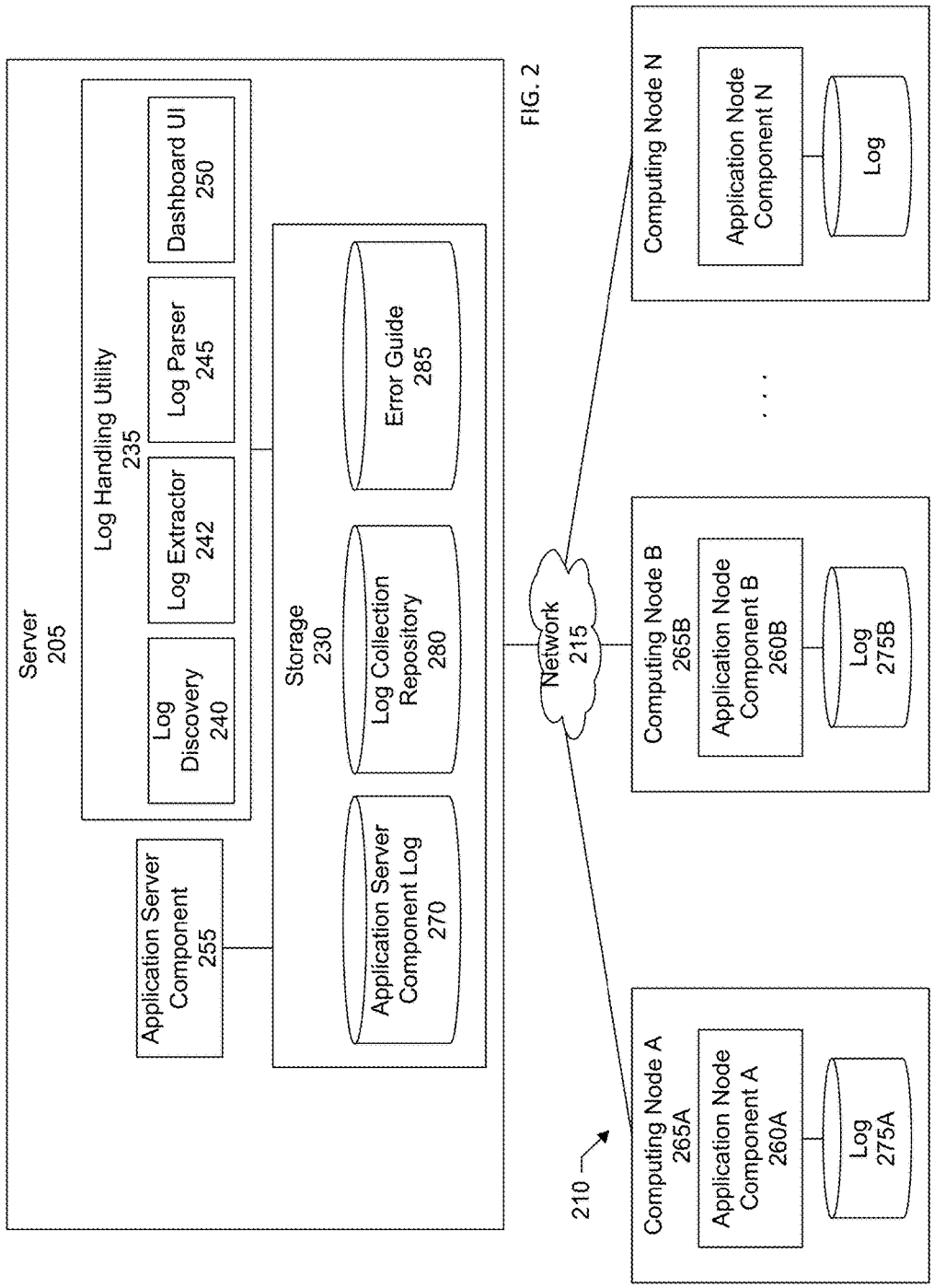
FIG. 2 shows a more detailed architecture of a system in which a log handling utility may be implemented under some embodiments.

FIG. 2 shows a more detailed diagram of a system for handling error logs of an application program. As shown in the example of FIG. 2, there is a server 205 and a set of computing nodes 210 that are interconnected by a network 215. The network, server, and computing nodes may be as described above. For example, the server and computing nodes can include general purpose computers including hardware and software components described, applications, a processor, memory, storage (e.g., storage 230), display (e.g., electronic display or screen), and so forth. The system can include any number of servers, clients, and computing nodes.

The server includes a log handling utility 235 which includes a log discovery module 240, a log extractor 242, a log parser 245, and a dashboard user interface 250. An application program having various components and processes (e.g., daemons) is deployed across the computing environment shown in FIG. 2. For example, there can be an application server component 255 installed at server 205, an application node component A 260A installed at a computing node 265A, an application node component B 260B installed at a computing node 265B, and so forth. The servers and computing nodes may be separate or remote from each other.

The log handling utility is responsible for collecting the various logs of the application program, analyzing and parsing the logs, and providing to a user through a graphical user interface (GUI) resolutions to error messages logged in the log files and metrics associated with the logged messages.

More particularly, each component of the application program may be designed to perform a specific task associated with the application. During execution of the application program, the application program (or the components and processes of the application program) generate log files. For example, a log 270 generated by the application server component may be stored at server 205. A log 275A generated by application node component A may be stored at computing node 265A. A log 275B generated by application node component B may be stored at computing node 265B.

The log files can include brief messages that may indicate errors, problems, issues, operations, changes, status, devices (e.g., device changes or device failures), device drivers, device system changes, operations, events, and so forth that are associated with the application. Keeping the messages relatively brief in the log files helps to reduce the storage space needed to maintain the log files. The log files provide an audit trail of the operation of the application so that users can understand the activity of the application and diagnose problems. The users can be administrators of the application program, customers, customer service and support representatives, quality assurance (QA) development groups, and so forth.

The log files, especially for a complex application deployed across many servers, clients, and other computing nodes, can include thousands upon thousands of entries. In some cases, despite having relatively brief messages and other attributes, a log file may be about 2 gigabytes (GB) or more. Some entries may include critical error messages that affect key functions of the application. Other entries may be less important. It can be very difficult, time-consuming, and burdensome for a user to gather the logs from the various components, digest or sort through the messages to identify those needing immediate attention, and research the appropriate resolution.

In particular, the troubleshooting of application errors and warnings is a key challenge to developers, QA engineers, support folks, and others who are involved in the debugging of such issues. In a specific embodiment, a dashboard or other graphical user interface is provided by the log handling utility so that users can observe errors, warnings, or both on a daily basis and take proactive measurement for a possible fix. The dashboard or graphical user interface (GUI) allows users to easily analyze the ongoing activities in the application and troubleshoot and debug errors and warnings. In some cases, a customer of an application program, such as a backup and recovery application program, will rarely restart the application on their production site in order to, for example, ensure that data is continuously backed up and available. As a result, the size of the each log file (e.g., daemon.log) may be extremely large (e.g., 2 GB). The setup or environment of the customer site can include a very large number of clients (e.g., 100 backup clients, 100 volumes, daily backups, etc.). As a result, there can be a very large number of logs that are accumulated.

Typically, in order to handle errors, the customer has to manually look into the warnings or errors that are logged in the log files (e.g., daemon.log) and segregate the errors. Segregating the errors, warnings and failures that occur each day is extremely time-consuming. Analyzing the logs is a very time-consuming task for customers, support folks, QA team, and others. Many applications lack sufficient error handling mechanisms, a dashboard for quick observations about log messages, proper information about steps or workarounds to troubleshoot error messages, a central location in order to obtain more information about warnings and errors, and auto search options where the administrator can customize the search for errors, warnings and failures in the application.

In a specific embodiment, a dashboard package is provided along with the application program product. The dashboard may be packaged for the binaries of the application. In a specific embodiment, the dashboard package is provided in a backup application referred to as NetWorker from EMC Corporation. NetWorker is an enterprise level backup and recovery application program that helps to automate backups to tape, disk, or other storage media across physical and virtual environments. A central server manages a datazone that includes clients to be backed up (i.e., backup clients) and storage nodes which save the backup data to the backup media. NetWorker components are managed through a NetWorker Management Console (NMC). A feature of the log handling utility triggers scheduled debugging from a centralized location such as NMC and includes a dashboard for quick observation of log messages and corresponding resolutions.

NetWorker includes a set of tiers (e.g., three tiers) including a client component, storage node component, and server component, each of which may be installed on separate machines. For example, the server component may be installed on a management server. The client component may be installed on a client computer whose data is to be backed up. The storage node component may be installed on a storage node server. The client component is responsible for identifying the client data to be backed up. The storage node component is responsible for managing the backup media storing the backed up client data. The server component is responsible for coordinating between the various client backup application components and the storage node to backup client data to the storage node. Each component generates a log file. For example, the client logs may include messages generated at the backup client. The storage node logs may include messages related to where the backup has been stored. The server logs may include messages related to overall operations of controlling the system. In an embodiment, the log handling utility monitors the logs generated by each component of the application.

Log discovery module 240 is responsible for discovering the logs generated by the components of the application. The log discovery module scans the various computers of the network over which the application is deployed to discover the log files. In a specific embodiment, the log discovery module scans a default location (e.g., default folder path) where the log file may be stored. If the discovery module is unable to find the log file at the default location, the discovery module may begin traversing the entire folder or directory tree of the computing node hosting the application component to find or locate the log file. The log discovery module may access a list that identifies the hosts of the various application components and the default folder locations where the application log files are stored.

The log discovery module may poll each computing node periodically such as daily, hourly, bi-weekly, or at any other frequency as desired for the log file. Instead or additionally, each application component may be configured to periodically send their log files to a central server (e.g., server 205). For example, the log files may be scheduled to be sent during off-peak hours such as in the early morning hours. Instead or additionally, the log files may be collected on-demand such as in response to a user issuing a command to the utility to gather the log files.

The log extractor is responsible for extracting or fetching the log files from the various computing nodes and collecting the received logs into a log collection repository 280. In a specific embodiment, the log discovery module, upon discovering a log file, passes to the log extractor information that allows the log extractor to locate and extract the log file. The information may include, for example, the hostname, component type, log path location, log filename, or other information, or combinations of these.

In a specific embodiment, a computing or client node sends an entire log file to the server. After the log file is transmitted, the log file may be deleted from the node in order to increase the storage space available at the node. In another specific embodiment, a portion of the log file is sent. For example, there can be a logging agent at a computing node which prescreens or filters a log file generated at the computing node. The logging agent identifies log entries meeting or not meeting certain criteria and can copy or move those log entries into another abbreviated or partial log file which is then sent to the central server. For example, the criteria may specify that unique critical error messages are to be copied into the abbreviated log file and sent while duplicate and non-critical error messages are not to be sent in the abbreviated log file. This feature helps to conserve network bandwidth by reducing the size of the log file that is transmitted over the network. Log entries from a full log file that are copied into an abbreviated log file to be sent to the server may be deleted from the full log file in order to conserve storage space at the node.

Options including the frequency at which the log files are transmitted, the time that the log files are transmitted, the filter criteria for prescreening the log files, whether a full log file or a partial log file is sent, and other options can be user-configurable. These options may be user-configurable based on application component, application component type, computing node (e.g., hostname), computing node type, or combinations of these.

For example, a first computing node which hosts a first type of application component may be configured to transmit a first log file generated by the application component on a daily basis. A second computing node which hosts a second type of application component, different from the first type of application component, may be configured to transmit a second log file generated by the application component on a weekly basis. One of the first or second log file may be a full log file. Another of the first or second log file may be a partial log file. This flexibility and level of customization helps to accommodate the different needs of different organizations and the application programs they wish to run. For example, the log files of application components involved in critical application functions may be monitored more frequently or more closely than the log files of application components involved in less critical application functions.

The log parser is responsible for parsing and analyzing the entries of the log files collected by the log extractor. The analysis may include filtering, searching, or scanning for entries meeting (or not meeting) certain criteria (e.g., searching for entries having critical error messages). The analysis may include cross-referencing a message logged in a log file to an online error guide 285. The log parser can search the error guide for a resolution to an error indicated in the message.

The error guide includes one or more error resolutions corresponding to the error message that the user can follow to resolve the problem. An error resolution may include, for example, steps for a work-around, instructions for addressing the problem, configuration suggestions, a list of things to check, contact information for additional help, a more detailed description of the message, and so forth. The error guide may be stored in any type of data format. For example, the error guide or details in the error guide may be stored in various fields of a database table, in a file such as an Extensible Markup (XML) formatted file or Adobe Portable Document File (PDF), or combinations of these.

The error guide may be maintained separately from the error logging modules of the various application components. For example, the error guide may be stored separately from the log files having the logged messages. The error guide may be accessed independently of the log files. For example, the error guide may be accessed online (such as through a browser program) without accessing the log files. Decoupling the error guide from the error logging modules of the application components allows updates to be made to the error guide without having to redeploy, reinstall, or patch the application components.

For example, new or updated findings regarding how to address a problem indicated by an error message can be easily added to the error guide without affecting the operation of the application components. The level of detail provided in the error guide may be greater than the level of detail provided in the logged error messages. For example, the logged error messages may be relatively brief in order to conserve storage space at the machine where the log file is generated and reduce the amount of network bandwidth required to transmit the log file. The error guide, however, may be stored separately from the log files and may include more detail regarding a logged error message.

The dashboard user interface module provides a graphical user interface through which a user can interface with the log handling utility. For example, the user can provide input to the utility and view output from the utility through the dashboard. More particularly, using the dashboard, the user can view a logged error message and a corresponding resolution. The dashboard may include a search engine to search and filter the log files according to criteria input by the user. For example, the user may use the utility to search, query, or filter the log files based on criteria such as message type, category, or classification (e.g., system error, severe, warning, information, notification, critical, noncritical, fatal, or nonfatal), message time and date, application process, application component, hostname, message text, or combinations of these. The utility allows the searches to be saved or "followed" by the user so that the user does not have to reenter the search criteria.

It should be appreciated that FIG. 2 is merely illustrative of an embodiment. The blocks can be functional rather than structural so that it is possible to have many different hardware configurations that can perform the illustrated functions. Implementation of the functional entities may vary. For example, in some cases the log discovery and log parser modules are combined into one code module. In other cases, the log discovery and log parser reside in separate code modules. One of ordinary skill in the art would recognize other variations, modifications, and alternatives.

Figure 3:
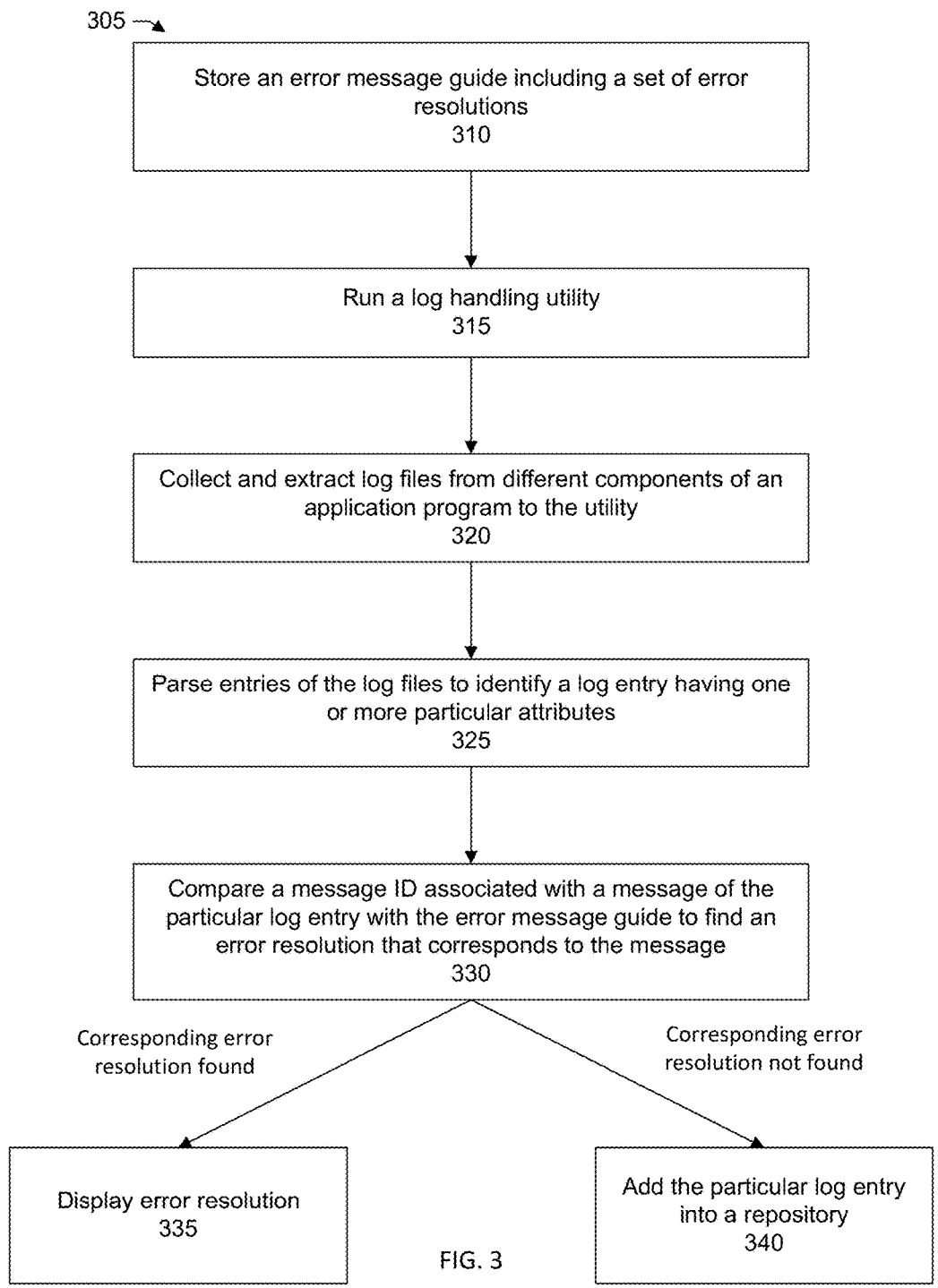
FIG. 3 shows a flow diagram for handling log files according to a specific embodiment.

FIG. 3 shows an overall flow 305 for handling messages in log files. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, an error message guide is stored. The error message guide may include an error resolution that corresponds to an error message. Below are some examples of error resolutions and corresponding error messages and other attributes, parameters, or properties that may be associated with the error resolution and message and that may be included in the error message guide. These example messages and error resolutions are associated with the application program referred to as NetWorker from EMC Corporation. It should be appreciated that while some embodiments are shown and described in conjunction with NetWorker, aspects and principles of the system can be applicable to other application programs.

---

MESSAGE: A daemon requested information for a user session, but the user session was not found in the list of valid sessions
MESSAGE ID: 2134
TYPE: Informational
SOURCE: nsrexecd
DESCRIPTION: This message is generally seen when NetWorker is requesting a volume to write to, but has not received a volume for 120 minutes or longer. This generally indicates that the server does not have volumes available for writing, for example, a request volume is not mounted.
RESOLUTION: Ensure that a volume is available for writing.

---

MESSAGE: Cannot find attribute '<attribute_name>' for jukebox '<jukebox>:
MESSAGE ID: 43246
TYPE: Warning
SOURCE: nsrd
DESCRIPTION: he specified attribute is missing from the jukebox resource.
RESOLUTION: Check the jukebox resource to ensure that a value is provided for the specified attribute.

---

MESSAGE: Another diskette is required
MESSAGE ID: 6877
TYPE: Notification
SOURCE: client GUI
DESCRIPTION: NetWorker software cannot proceed with the diskette currently in the drive.
RESOLUTION: Insert a new diskette.

---

MESSAGE: Cannot find device '<device_name>' in the list of configured devices
MESSAGE ID: 15435
TYPE: Warning
SOURCE: nsrmmgd
DESCRIPTION: An attempt was made to associate a device with a jukebox that is not configured as a NetWorker resource.
RESOLUTION: Configure the device and add it to the jukebox.

---

MESSAGE: Cannot fetch volume after <vol> record <decimal>
MESSAGE ID: 9787
TYPE: Noncritical error

---

SOURCE: nsrmmdbd
DESCRIPTION: This message may appear during media database compression. An unreadable volume record was encountered. The record will be skipped or removed from the database.
RESOLUTION: No action required.

---

MESSAGE: Fatal media database error
MESSAGE ID: 5590
TYPE: Fatal Error
SOURCE: nsrmmdbd
DESCRIPTION: Fatal error messages are not expected to occur with the new media database journaling. There is a potential, through user error, for coding errors and unhandled error conditions to cause data corruption. The current implementation of NetWorker software attempts to recover from these coding and unhandled error conditions. Generally, the software detects the errors as soon as possible and removes the invalid database entries.
This puts the media database back into a consistent state, although there may be some data loss.
Whenever possible, the corrupted records will be identified so the administrator can determine the extent of the data loss. With this information, the administrator can determine if additional recovery mechanisms, such as restoring a media database from the bootstrap, are necessary.
RESOLUTION: The general approach to resolving any fatal media database problem is to go to https://support.EMC.com/ for technical assistance in assessing and recovering from the errors. Go to https://support.EMC.com/ for technical assistance after completing the following steps:
1. Shut down the media database if it has not done so automatically.
2. Save a copy of the media database directories by using standard tools, such tar or zip.
Make a copy of the database before restarting it. Restarting the database may cause the scavenge process to start restoring the media database by rebuilding the database from the data records and rebuilding the internal indexes.
Restart the process to start additional database consistency checks.
Consistency is restored by the removal of records that cross-reference nonexistent records.
This process creates a restored, consistent media database. However, it may also remove hundreds or thousands of records, depending on the level of corruption.
Making a copy of the database before the media database is restored enables Technical Support to conduct a post-analysis of the database and determine how to restore additional database records.
In a situation where the corruption was severe, the media database can be recovered from the bootstrap by using the mmrecov command.
NetWorker software attempts to generate a bootstrap every day, so no more than one day's worth of data should be lost.

---

As discussed above, the error message guide may be stored as a PDF file, in a database table, or both. For example, a table storing the error guide may include a first field that stores a message (e.g., "A daemon requested information for a user session, but the user session was not found in the list of valid sessions."), a second field that stores a message identifier (e.g., "2134"), a third field that stores a message type or category (e.g., "Informational"), a fourth field that stores a source of the message such as the component or process that generated the message (e.g., "nsrexecd"), a fifth field that stores a more detailed description of the message (e.g., "This message is generally seen when NetWorker is requesting a volume to write to, but has not received a volume for 120 minutes or longer. This generally indicates that the server does not have volumes available for writing, for example, a request volume is not mounted."), and a fifth field that stores a resolution corresponding to the message (e.g., "Ensure that a volume is available for writing.").

In a step 315, a log handling utility is run. The log handling utility (or discovery module of the utility) checks the logs generated by the different components of the application such as (in the case of the NetWorker backup application) the client component, storage node component, and so forth. As discussed above, the log handling utility can perform a discovery of the application log by accessing a default location where an application component stores the associated application log. The discovered information including the hostname (e.g., host IP address), component type, log path location, log filename, and other information may be provided to the log extractor module of the utility. The location of the log files may differ based on the platform on which the application is run (e.g., Unix and Linux versus Windows).

The utility can be run on-demand. For example, the user may launch the utility by clicking or double-clicking an application icon or menu item associated with the utility. Instead or additionally, the utility can be run automatically according to a predefined schedule or run continuously alongside with the application program whose log files are to be analyzed, monitored, and received by the utility. The utility may be provided as an integral component of the application program, as a separate add-on module to the application, or may run separate from the application program.

In a step 320, the utility collects, receives, and extracts log files from different components of an application program to the utility. The utility may consolidate or merge the log files from the different components into a single consolidated log file for analysis. The utility may store the path locations and IP addresses of where the log files are stored so that the utility can obtain the log files. If the utility is unable to find a log file at a default location, but is able to find the log file at a different location, the utility may update the default location to the different location. Thus, when the utility attempts a next access of the log, the utility can retrieve the log from the new default location without having to rescan. A log file may be created by a component of the application program. A log file may include a set of log entries generated by a set of processes associated with the application program. The log file may be formatted as a text file or other file format as appropriate.

Below is an example of a format for a log entry.

--- day hh:mm:ss: hostname: process: identifier: message

---

As shown in the example above, in a specific embodiment, each log entry includes a set of attributes, parameters, or properties. A first attribute (e.g., "day") specifies the date the message was generated. A second attribute (e.g., "hh:mm:ss") specifies the hour, minutes, and seconds the message was generated. A third attribute (e.g., "hostname") specifies the network name for the computer that generated the message. A fourth attribute (e.g., "process") specifies the process or source that generated the message. A fifth attribute (e.g., "identifier") specifies the message's numeric identifier and priority. The numeric identifier may be a numeric value generated from the hash signature of the message. An identifier for the message can include numbers, letters, or combinations of numbers and letters that uniquely identify a particular message. The priority is a period-separated pairing of the reporting process's system facility type and the severity level of the message.

In this specific embodiment, there are five types or categories of messages. A first message type is identified as "informational" and refers to information that may be useful, but does not require any specific action. A second message type is identified as "warning" and refers to a temporary problem that the application software may resolve or prompt the user to resolve. A third message type is identified as "notification" and refers to errors that the user is required to resolve. A fourth message type is identified as "noncritical error" and refers to errors that do not interrupt the application's services, but should be resolved before they become fatal errors. A fifth message type is identified as "fatal error" and refers to errors that cause the application services to become disabled or dysfunctional. It should be appreciated, however, that there can be any number of different message types or categories.

A sixth attribute "e.g., "message" specifies the actual message text. More than one entry in the messages file may be used to fully display the entire message for an error. Below is an example of four entries in a log file that refers to a single error-message event.

---

Jun 9 10:22:59 sun-blade-01 unfsmntd[22075]: [ID 234102 daemon.crit]
NFS mount/umount request from

---

Jun 9 10:22:59 sun-blade-01 unfsmntd[22075]: [ID 912629 daemon.crit]
insecure port(non-root): address 137.69.44.235

---

Jun 9 10:22:59 sun-blade-01 unfsmntd[22075]: [ID 699753 daemon.crit]
Offending port:32771

---

Jun 9 10:22:59 sun-blade-01 unfsmntd[22075]: [ID 308900 daemon.crit]
NFS requestfrom address 137.69.44.235 probably from non-root user.

---

A message may include a variable that allows the message to be customized for a given system, user, task, and device. When these messages appear, the variables they contain are replaced with information specific to the environment and action that prompted the message. For example, a variable <appliance> may refer to a name of a particular appliance. A variable <client> may refer to a client system name. A variable <device> may refer to a name of a media device. A variable <device_type> may refer to a type of a media device. A variable <IP_address> may refer to Internet Protocol (IP) address used to identify a computer on the network. A variable <pid> may refer to a process ID number that identifies a process that is running on a computer system. A variable <vol> may refer to a name of a volume, and so forth.

Listed below are some further examples of messages of type system error, severe, warning, informational, and notification, respectively.

---

101451 03/24/15 10:40:03 3 1 104 1442821888 19850 0
racdd096.nwperf.com nsrexecd
SYSTEM error Unable to exchange NW instance ID's for GSS
authentication: Connection reset by peer 77576 10/10/14 14:15:49 nsrd RPC severe Unable to authenticate client racdd096.nwperf.com using RPCSEC_GSS: Remote system error - Connection refused

---

71191 03/26/15 00:02:13 0 0 0 2088183584 21251 0
racdd096.nwperf.com nsrd NSR info
Registration Warning event: License enabler #CLP-UE-15 (CLP Update License) will expire in 29 days. See 'Entering an authorization code' in Online Help.
71193 04/16/15 07:26:32 0 0 0 594499360 10941 0
racdd096.nwperf.com nsrd NSR info Media
Warning: Jukebox '1STK_L180_9020530000' Hardware status of jukebox
'1STK_L180_9020530000' changed from 'ready' to 'cannot access the hardware'

---

71193 04/09/15 10:40:47 0 0 0 594499360 10941 0 racdd096.nwperf.com nsrd NSR info Media
Info: Jukebox 1STK_L180_9020530003 is now enabled.

---

71193 05/12/2015 07:59:41 PM 0 0 0 824204576 25756 0
raddh056.psr.com nsrd NSR info
Media Notice: no matching devices for save of client 'radcc040'; check storage nodes, devices or pools

---

In a step 325, the utility parses, or filters entries of the log files to identify log entries having one or more particular attributes. In a specific embodiment, the one or more particular attributes include message type. For example, the entries of the log files may be filtered to obtain entries having messages of type fatal and omit or exclude entries having messages that are not of type fatal. The logs may be filtered to obtain entries having messages of types fatal or noncritical and omit entries having messages that are not of types fatal or noncritical.

In another specific embodiment, the one or more particular attributes includes process type and message type. For example, the entries of the log files may be filtered to obtain entries having messages generated by one or more particular processes of the application and which are of one or more specific message types. The utility can filter the entries in the log files based on any attribute or combination of attributes associated with the log entries. For example, parsing the logs may be performed to segregate the logs based on, for example, "<ID>," "<process name>," "<category>," and "<error string>." Filtering the logs helps to reduce the amount of information that is presented to the user so that the user can easily digest the information. In a specific embodiment, messages having a high priority (e.g., fatal error messages) are automatically presented on the dashboard and messages having a low priority (e.g., informational message) are not automatically presented on the dashboard.

Table A below shows some entries with some sample data from one or more log files and some attributes that may be associated with the entries.

TABLE A

| Message ID | Message Type | Source (e.g., process) | Message |
| --- | --- | --- | --- |
| 5590 | Informational | nsrd | Broken pipe. |
| 6824 | Informational | nsrjb | Cancellation is in progress. |

TABLE A-continued

| Message ID | Message Type | Source (e.g., process) | Message |
| --- | --- | --- | --- |
| 15435 | Warning | nsrmmgd | Cannot find device ORION in the list of configured devices |
| 15330 | Informational | nsrmmgd | Cannot read t.he current volume label. |
| 12285 | Notification | nsrclone | Cloning not supported; upgrade required. |
| 11537 | Noncritical error | nsrmmd | Duplicate name; pick new name or delete old one. |
| 5246 | Fatal | recover | ERROR: Failed to create post-restore action. System is out of available memory. |
| 4043 | Noncritical error | nsrjb | Destination component full |
| 5882 | Noncritical error | nsrclone | Failed to clone any save sets. |

Table B below shows a result of filtering the entries shown in table A above based on the message type being fatal, a noncritical error, or warning.

TABLE B

| Message ID | Message Type | Source (e.g., process) | Message |
| --- | --- | --- | --- |
| 15435 | Warning | nsrmmgd | Cannot find device ORION in the list of configured devices. |
| 11537 | Noncritical error | nsrmmd | Duplicate name; pick new name or delete old one. |
| 5246 | Fatal | recover | ERROR: Failed to create post-restore action. System is out of available memory. |
| 4043 | Noncritical error | nsrjb | Destination component full |
| 5882 | Noncritical error | nsrclone | Failed to clone any save sets. |

In a step 330, the utility compares a message ID associated with a message of the particular log entry with the error message guide to find an error resolution that corresponds to the message. In a step 335, if the corresponding error resolution is found in the error message guide, the error resolution is displayed on an electronic screen for the user to view. The user can then take the appropriate steps outlined in the error resolution to fix the problem. The error resolution may be displayed on a dashboard user interface.

For example, according to the sample data above, there is a first entry in the filtered log having a message ID attribute value of "15435" which is associated with the message "Cannot find device ORION in the list of configured devices." The utility searches or cross references the error resolution guide using the message ID attribute value of "15435" to identify the error resolution corresponding to the message. In this case, there is a match of the message ID in the error resolution guide and the corresponding error resolution is displayed. For example, the error resolution text "Configure the device and add it to the jukebox." may be displayed on the dashboard.

In a step 340, if the corresponding error resolution cannot be found in the error guide, the utility may add the particular log entry into a repository. The repository can store a listing of error messages that do not have corresponding error resolutions. A user such as a developer of the application can review the listing and then update the error guide with the appropriate error resolutions. The utility may analyze the listing of error messages with missing error resolutions and provide metrics such as a count of the number of times a particular error message with a missing error resolution has been entered into the repository. The count may be displayed on the dashboard. The count can help the developer prioritize the updating of the error guide. For example, error messages that are entered into the repository more frequently than other error messages may be given priority over the less frequently entered error messages for the development of corresponding error resolutions.

In another specific embodiment, if the corresponding error resolution cannot be found in the error guide by matching on the message ID, the utility performs a string matching comparison. That is, the utility compares the text of the message (e.g., "Cannot find device ORION in the list of configured devices.") with the error guide. If there is a match between the message texts, the utility displays the corresponding error resolution. Alternatively, if there is not a match, the utility may add the particular log entry into the repository listing of missing error resolutions so that the error guide can later be updated.

The utility may compare a portion of the message with the error guide. Variables in the message may be omitted or excluded from the comparison with the error guide because these variables may refer to customized values that would typically not be included in the error guide. For example, the message "Cannot find device ORION in the list of configured devices" includes a device name variable having the customized value "ORION." In this case, the value "ORION" may be omitted from the comparison with the error guide because the error guide would typically not include such values as these values may be specific or customized for a particular environment.

Comparing a message ID is generally faster than comparing the message string. Thus, comparing the message string may be used as an alternative for when comparing with the message ID does not return any hits or matches. Message IDs may be missing from the error guide for any number of reasons. For example, development of the error guide may lag behind the development of the application and error logging mechanism, there may be a discrepancy between the error logging mechanisms of the application and the error guide, and so forth.

Message strings may be matched based on exact string matches or fuzzy string searching. For example, a Levenshtein distance or other edit distance may be calculated to measure the difference between the logged message and the messages in the error guide. A Levenshtein distance is a string metric for measuring the difference between two sequences. Generally, the Levenshtein distance between two words is the minimum number of single-character edits (i.e., insertions, deletions or substitutions) required to change one word into the other.

In this specific embodiment, there can be a user-configurable threshold edit distance. An edit distance is calculated between the text of the logged error message and an error message in the error guide. If the edit distance is below the threshold edit distance, an error resolution corresponding to the error message in the error guide is displayed. If the edit distance is above the threshold edit distance, a next edit distance is calculated between the logged error message and a next error message in the error guide. If the end of the error guide is reached without finding an edit distance below the threshold edit distance, the logged error message may be saved in a repository of missing error resolutions for later review.

Figure 6:
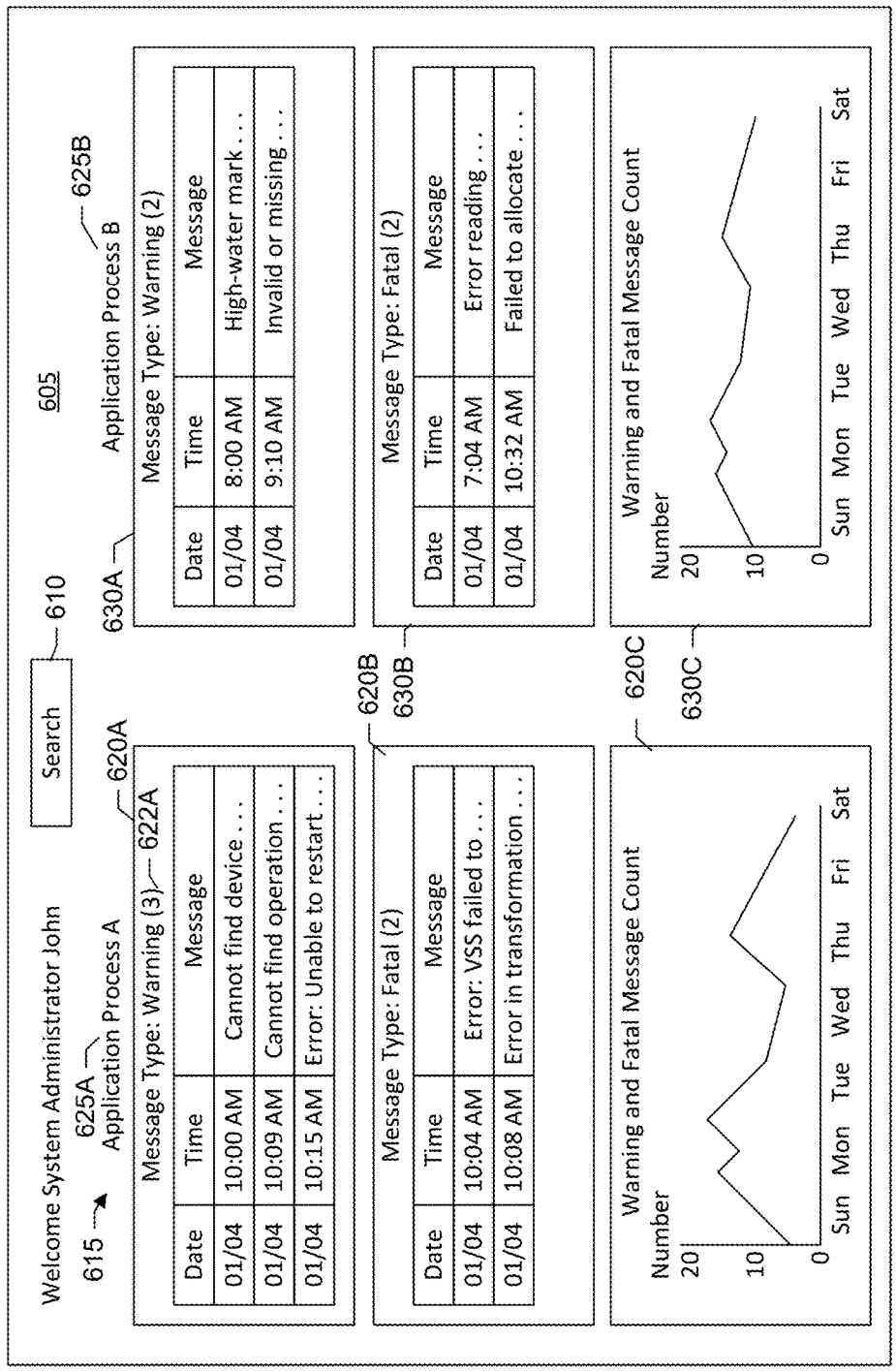
FIG. 6 shows an example of a dashboard user interface according to a specific embodiment.
Figure 7:
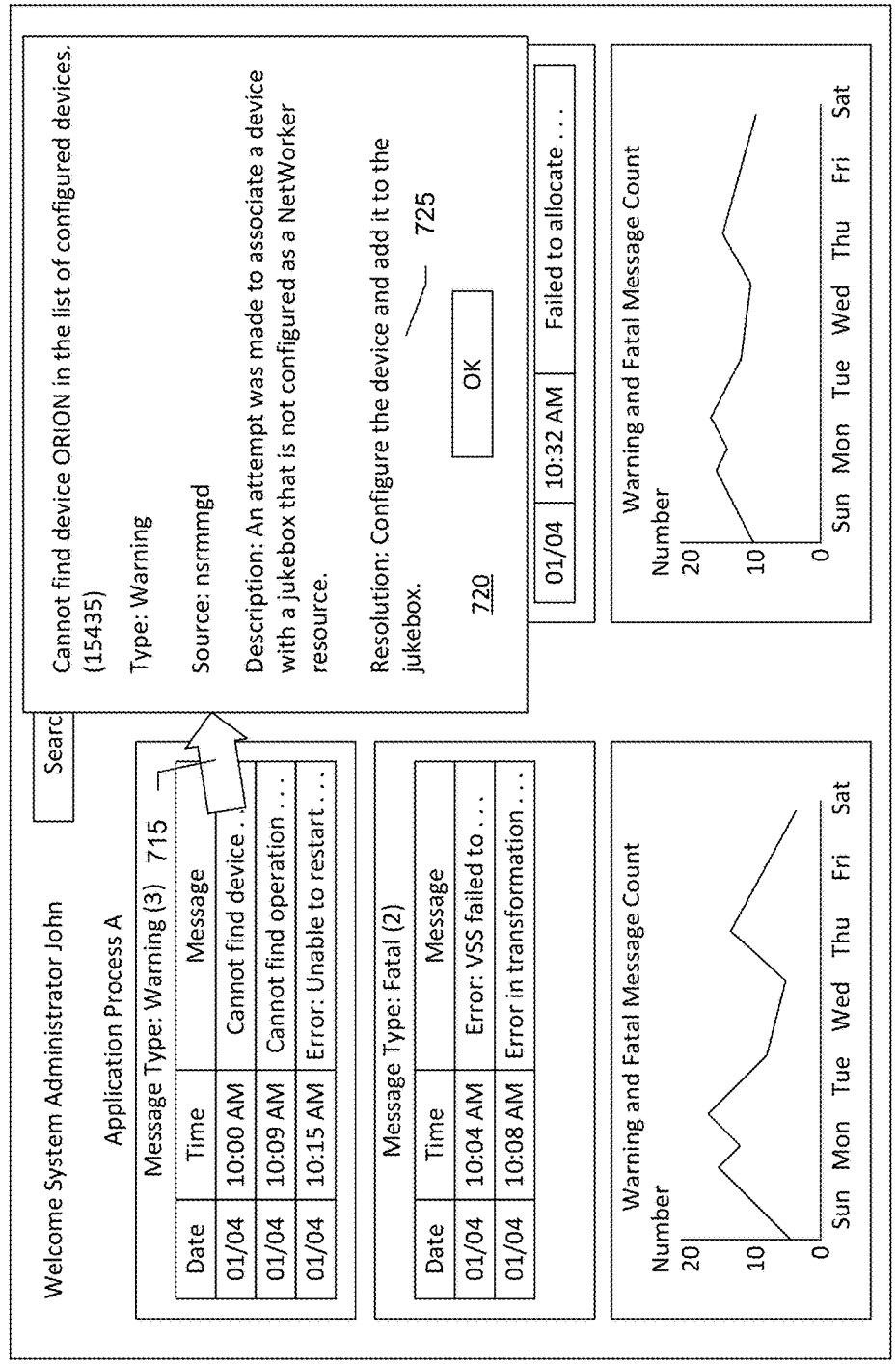
FIG. 7 shows an example of the dashboard user interface displaying an error resolution.

FIGS. 6-7 show an example of a dashboard user interface. FIG. 6 shows a dashboard user interface 605 in a first state. FIG. 7 shows the dashboard in a second state, after the first state. Referring now to FIG. 6, this example of the dashboard includes a search tool 610 and a set of panels 615. The search tool allows the user to specify search criteria for searching and filtering the logs. The panels summarize and display information about the logged messages.

In this example, panels 620A-C show error messages associated with an application process A 625A of the application. Panel 620A includes a grid, table, or matrix that lists messages of type warning that have been logged by application process A. A count 622A indicates a number of messages of the specified type that have been logged by the particular application process within a predefined period. The predefined period may be a rolling time period. For example, the count may indicate the number of messages logged within the last 12 or 24-hour period. The predefined period may be user-configurable. Panel 620B includes a grid that lists messages of type fatal that have been logged by application process A.

Each grid or table includes a set of columns that display various attributes associated with the logged entries. The grid may include a date, time, and message column. The date column lists the date that the message was logged. The time column lists the time that the message was logged. The message column displays the message text.

Panel 620C displays or plots a graph indicating an overall trend of the warning and fatal message counts associated with application process A. A first vertical axis of the graph indicates a number of the messages. A second axis horizontal axis of the graph indicates a time.

Similarly, panels 630A-C show error messages associated with an application process B 625B of the application. Panel 630A includes a grid that lists messages of type warning that have been logged by application process B. Panel 630B includes a grid that lists messages of type fatal that have been logged by application process B. Panel 630C displays or plots a graph indicating an overall trend of the warning and fatal message counts associated with application process B.

The information shown in the panels can be customized by the user. For example, the columns displayed in the grid can be user configurable. A user may select which attributes of the log entries to show or hide. The user may select the order in which the columns are displayed. The columns can be sortable. A user may select any number of time periods for plotting the number of the error messages. For example, the plot may be based on a day, week, month, or other time period as desired. Although FIG. 6 shows a line graph, the utility can provide for other types of graphs as well such as bar charts, pie charts, animated motion charts (e.g., user can press "play" button to see animation), and so forth.

The user can select a message displayed in the panels to view an error resolution associated with the message. For example, the user may use a pointing device such as a mouse to click on a particular message to see the corresponding error resolution. FIG. 7 shows an example where the user has clicked on a message 715. In response, the utility displays a dialog box 720 which provides further detail regarding the message including an error resolution 725.

Figure 4:
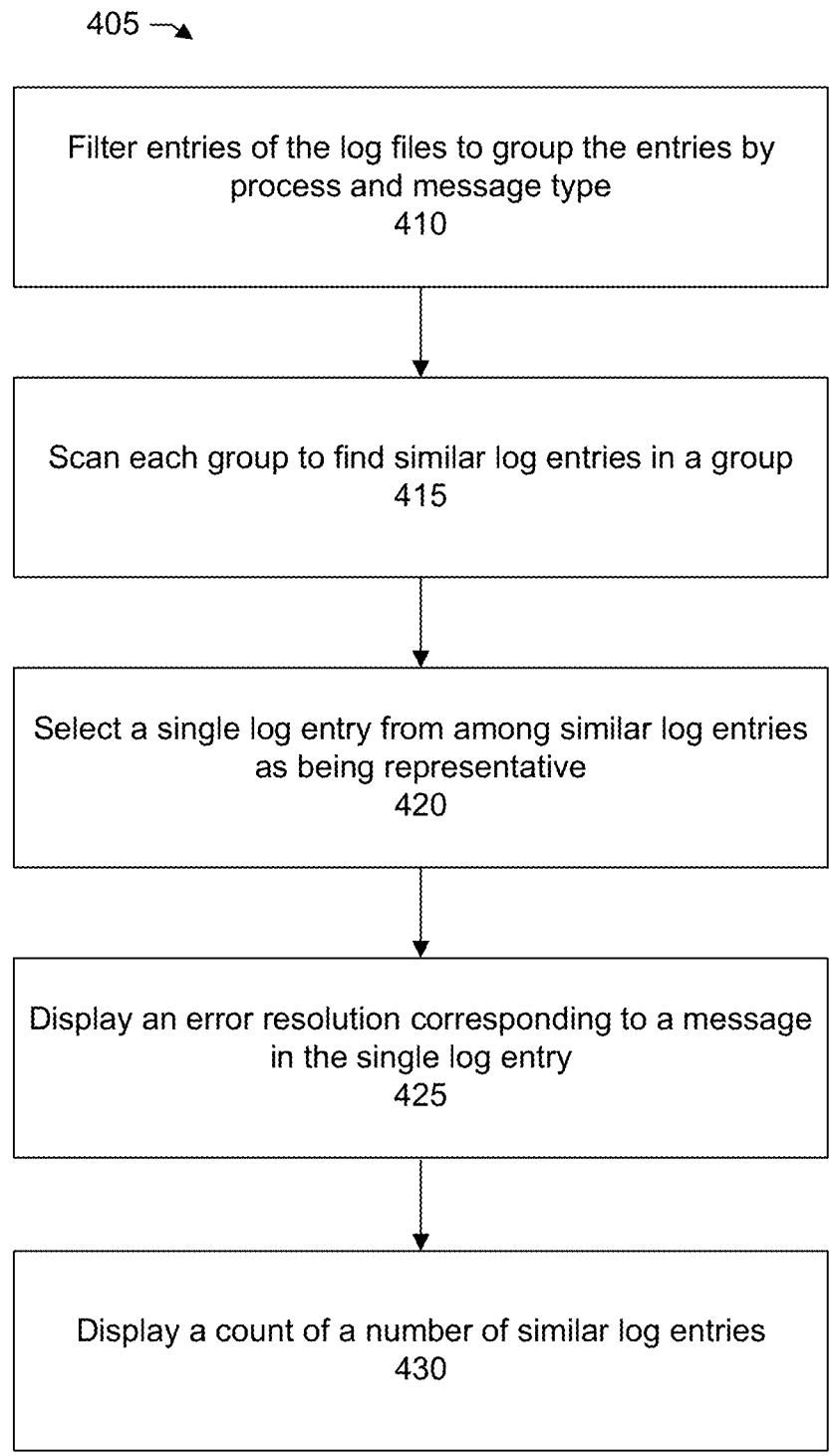
FIG. 4 shows another flow diagram for handling log files according to a specific embodiment.

FIG. 4 shows a flow 405 for handling similar or duplicate logged messages. For example, in some cases the application program may log thousands of instances of a same or similar error. A filtering technique of the utility can categorize the error for every process of the application. The utility can provide a count for the number of similar or duplicate log entries. This can be helpful during analysis because the user will be able to know which processes have logged similar errors and the number of times the errors have been logged. These metrics can provide an indication of the seriousness of the problem and potential causes of the problem.

In brief, in a step 410, the utility filters entries of the log files to group or categorize the entries by process type and message type. In a step 415, the utility scans each group to find similar log entries in a group. In a specific embodiment, the utility classifies same messages based on message ID. In a step 420, the utility selects a single log entry from among similar log entries as being representative. One or more attributes of the selected log entry (e.g., message ID, message text, or both) is compared with the error guide to find an error resolution corresponding to the logged message of the selected log entry. In a step 425, the error resolution is displayed. In a step 430, the system displays a count of a number of similar log entries.

In a specific embodiment, there is a method to identify similar error messages. The method includes receiving a set of log files from a set of hosts that host components of an application program. Each log file includes a set of log entries generated by processes associated with the application program. Each log entry specifies a process type, a message, a message type, and a message identifier.

The method further includes grouping the set of log entries based on the process and message type. A group of log entries may include entries from a first log file generated by a first component of the application program, and entries from a second log file generated by a second component of the application program. The log entries in the group may be of the same process and message type. The group of log entries may include multiple log entries having the same message identifier. The group of log entries may be filtered based on the message identifiers to obtain a single occurrence of a message identifier from among a set of identical message identifiers in the group of log entries.

An error guide may be searched using the single occurrence of the message identifier to retrieve an error resolution corresponding to a message associated with the single occurrence of the message identifier. The error resolution and a count of a number of identical message identifiers in the set of identical message identifiers may be displayed on an electronic screen.

This technique helps to eliminate or reduce duplicative searching of the error guide because searches using other occurrences of the same message identifiers associated with a particular process and message type may not be performed. The technique also helps the user with digesting the amount of information that may be collected in the log files. The technique further helps to provide the user with an indication of the number of similar or duplicate error messages that have been logged for a particular process. The utility may further display a first timestamp and a second timestamp, where the first timestamp indicates when a first message in the group having the same message identifier was initially logged, and the second timestamp indicates when a second message in the group was last logged. These timestamps can provide the user with an indication of when the error was first logged and when that same error was last logged. The information can help the user to pinpoint the cause of the problem. The utility may further calculate and display a duration between the first and second timestamps to provide the user with indication of how long the error has been happening.

A method may include filtering a set of log entries to identify a subset of similar log entries, selecting a single occurrence of a log entry from the subset as being representative of the subset of similar log entries, comparing a first message identifier of the selected single occurrence of the log entry with the error message guide to identify a first error resolution that corresponds to a first message of the selected single occurrence of the log entry, and displaying on the electronic screen the first error resolution and a count of a number of similar log entries in the subset.

Figure 5:
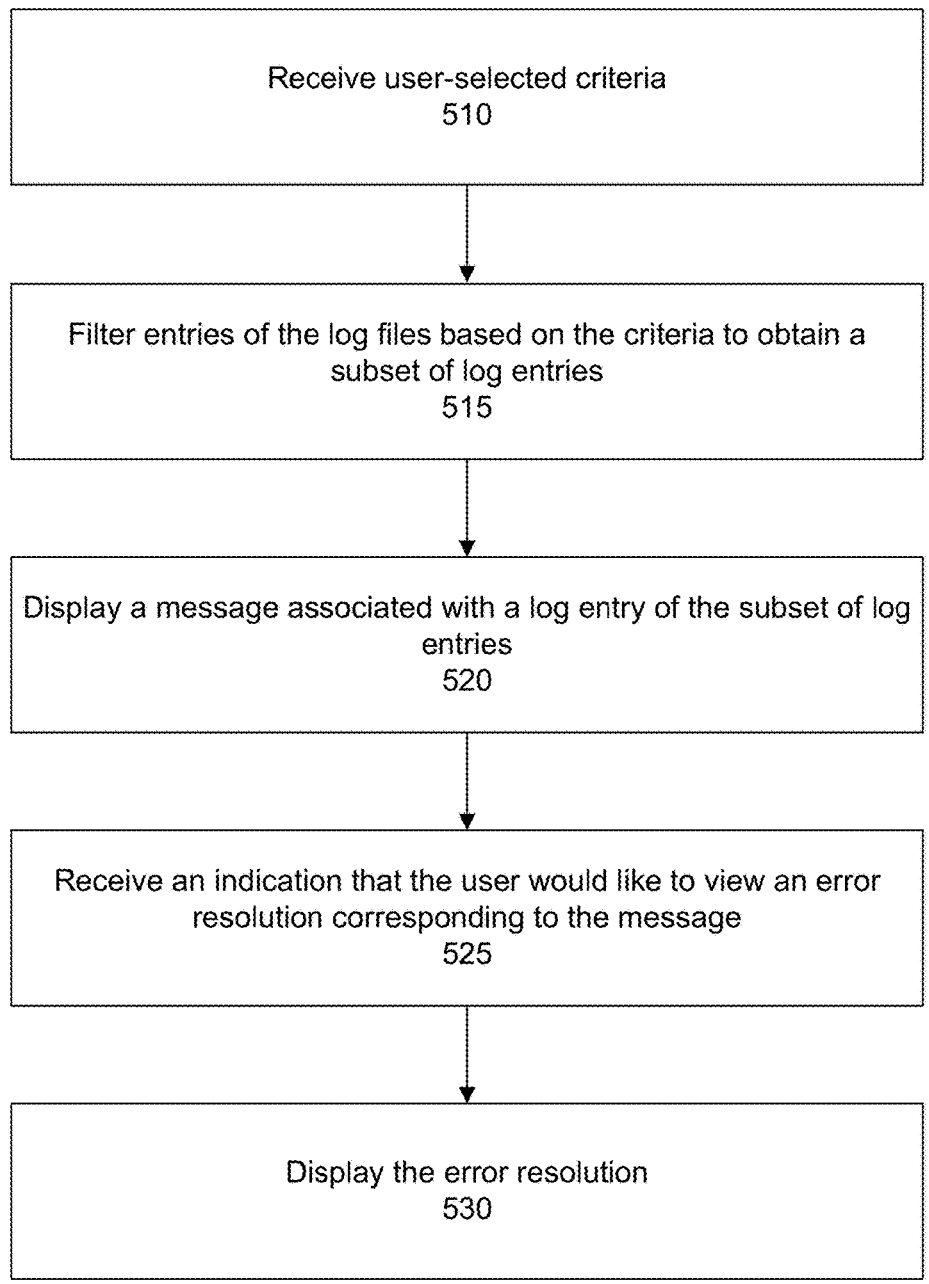
FIG. 5 shows another flow diagram for handling log files according to a specific embodiment.

FIG. 5 shows a flow 505 of a filtering or search tool of the utility. In a step 510, the utility receives user-selected search criteria. The user may specify as criteria any attribute, property, or parameter associated with the log entries such as application component, message type, process, message (e.g., message text), date, time, or combinations of these. In a specific embodiment, the search criteria specifies an application component, message type, and process. In a step 515, the utility filters and searches entries of the log files based on the criteria to obtain a subset of log entries. In a step 520, the utility displays a message associated with a log entry of the subset of log entries. In a step 525, the utility receives an indication that the user would like to view an error resolution corresponding to the displayed message. In a step 530, the utility displays the error resolution.

Figure 8:
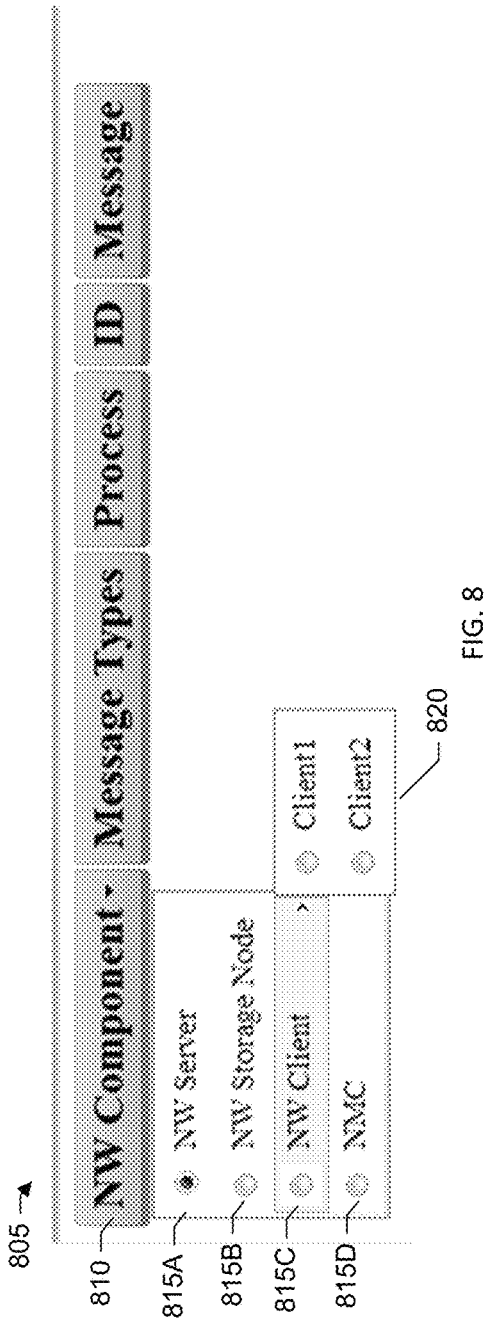
FIG. 8 shows an example of a screen shot of a first step of a sequence for selecting log filter criteria according to a specific embodiment.

For example, FIGS. 8-13 show a sequence of a set of menu options being selected from a menu bar or toolbar 805 that may be presented to the user so that the user can specify the search criteria. The menu bar may be displayed, for example, in response to the user selecting a search button from the dashboard. FIG. 8 shows a first step in the sequence where the user has selected a menu option 810 that lists various components or component types of the application program. There is a server component 815A, a storage node component 815B, a client component 815C, and a management component 815D. In this example, upon the user selecting the client component (or the application component of type client), the utility displays a submenu 820. The submenu includes a listing of the clients where the application client component is installed. The user can select from the submenu a particular client to view the log messages generated at the particular client by the client application component at the particular client.

Figure 9:
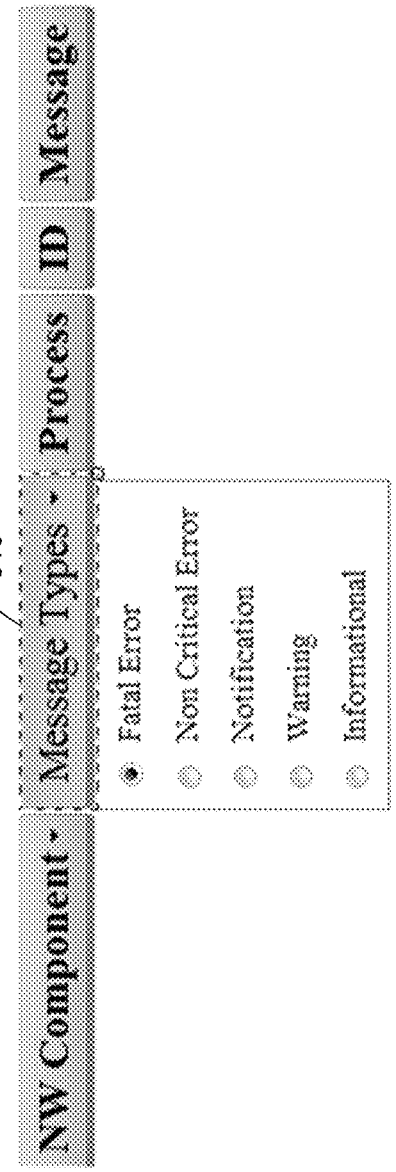
FIG. 9 shows an example of a screen shot of a second step of the sequence for selecting log filter criteria.

FIG. 9 shows a second step in the sequence. As shown in the example of FIG. 9, the user has selected a menu option 910 that lists the various message types generated by the application (e.g., "fatal error," "noncritical error," "notification," "warning," and "informational"). In the example shown in FIG. 9, the user has selected to view messages of type "fatal error."

Figure 10:
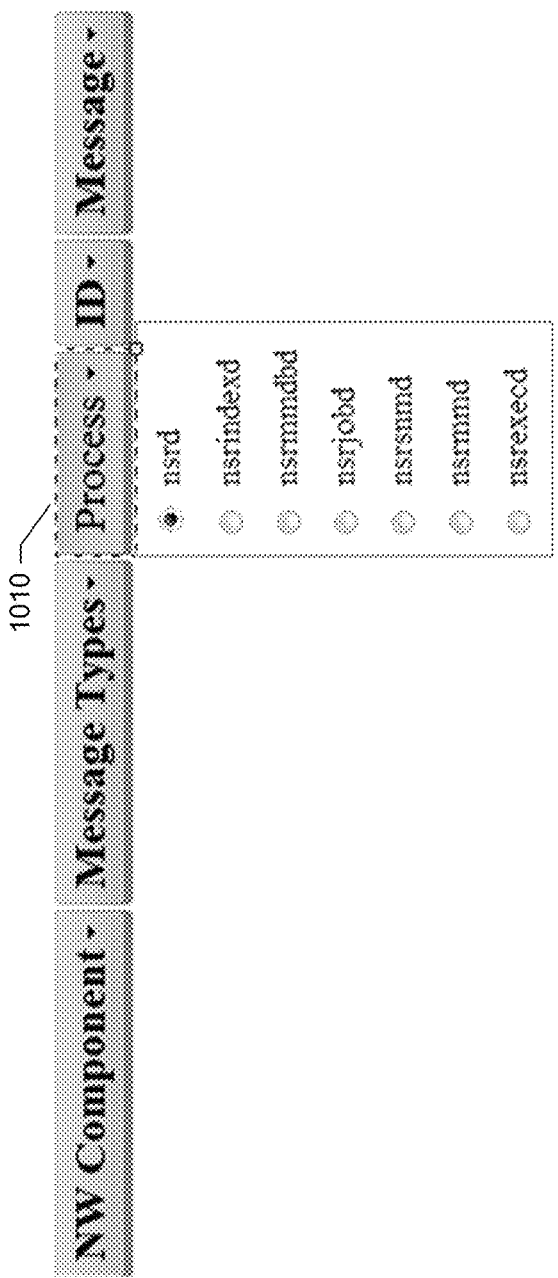
FIG. 10 shows an example of a screen shot of a third step of the sequence for selecting log filter criteria.

FIG. 10 shows a third step in the sequence. As shown in the example of FIG. 10, the user has selected a menu option 1010 that lists the various processes in the application. In the example shown in FIG. 10, the user has selected to view messages generated by the process "nsrd."

Figure 11:
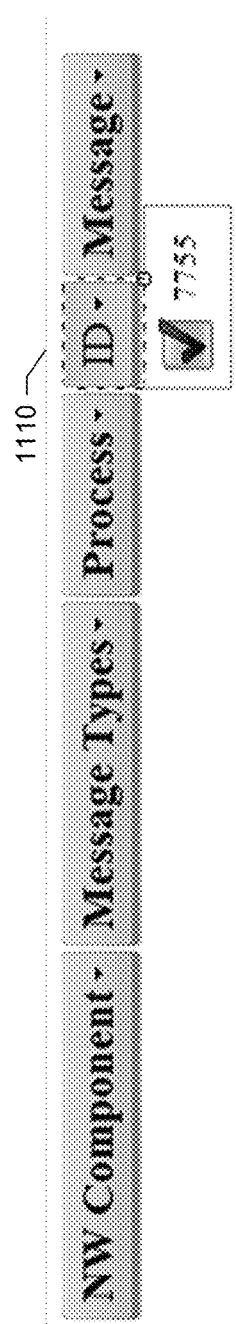
FIG. 11 shows an example of a screen shot of a fourth step of the sequence for selecting log filter criteria.

FIG. 11 shows a fourth step in the sequence. As shown in the example of FIG. 11, a menu option 1110 lists the message IDs generated by the selected process. More particularly, the listing of message IDs is the result of a filter having been applied by the utility based on the user's selections of the application component (FIG. 8), message type associated with the selected application component (FIG. 9), and process associated with the selected application component (FIG. 11). The user can select a particular message ID to view a message having the selected message ID.

FIG. 12 shows a fifth step in the sequence. As shown in the example of FIG. 12, a message 1205 having the selected message ID (FIG. 11) is displayed by the utility.

FIG. 13 shows a sixth step in the sequence. As shown in the example of FIG. 13, the utility may prompt 1305 the user as to whether the user would like to view the error resolution corresponding to the selected message (FIG. 12). Upon the user indicating "yes," the utility can display the corresponding error resolution.

It should be appreciated that the GUI screens, controls, and layouts shown in FIGS. 6-13 are merely examples. A GUI of the log handling utility may include any type of interactive widget or GUI element. Some examples of GUI elements include menus, buttons, tabs, toolbars, sliders, list boxes, icons, balloon help, tooltips, windows, dialog boxes, symbols, and so forth. For example, FIG. 14 shows an icon 1405 that may be displayed next to information messages. FIG. 15 shows an icon 1510 that may be displayed next to warning messages. FIG. 16 shows an icon 1610 that may be displayed next to critical messages. FIG. 17 shows an example of a taskbar 1710 in which icons associated with the messages (or message types) may displayed.

In a specific embodiment, a log handling utility or error handling mechanism includes a dashboard for easy administration. Different message types such as "information," "warning,", and "critical error" may be identified on the dashboard using different symbols for easy identification. The dashboard may include a count of the number of errors in a particular log, a count of a number of errors associated with a particular message type, a count of a number of errors associated with a particular application component or process, or combinations of these.

Indicating different types of errors with different symbols helps the user to easily identify in a dashboard those errors having the highest priority. A dashboard may include any number of tables that segregate the logs according to application component type, process, or other criteria. For example, a dashboard for a backup application may include backup client related logs in one table, storage node related logs in another table, and volume related logs in yet another table. The dashboard can display the number of warnings, errors, or both in a graph on daily basis.

In a specific embodiment, for more information about errors, the user can search for particular information in the online error guide repository using the log handling utility. The dashboard may provide balloon notification for critical errors to the administrator at a bottom left panel of the display, even though a network management console of the application may be minimized. Some benefits of the log handling utility include a dashboard which can provide quick or easily viewable information about logs; allowing for easy identification of recent logs; allowing for easy identification of top priority (e.g., critical errors) and troubleshooting of such errors; savings of time and energy; and providing the application administrator with visibility to allow the administrator to easily troubleshoot issues.

In a specific embodiment, a method includes storing an error message guide comprising a plurality of error resolutions, receiving a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type, parsing the plurality of log files based on the third and fourth attributes to identify a log entry associated with a particular process and a particular message type, comparing a message identifier of the log entry with the error message guide to identify an error resolution that corresponds to a message of the log entry, and displaying the identified error resolution that corresponds to the message on an electronic screen.

The method may include receiving from a user a selection of a process, and receiving from the user a selection of a message type, the selected process being the particular process, and the selected message type being the particular message type. The method may include filtering the plurality of log entries to identify a subset of similar log entries, selecting a single occurrence of a log entry from the subset as being representative of the subset of similar log entries, comparing a first message identifier of the selected single occurrence of the log entry with the error message guide to identify a first error resolution that corresponds to a first message of the selected single occurrence of the log entry, and displaying on the electronic screen the first error resolution and a count of a number of similar log entries in the subset.

The method may include based on the comparing, determining that the message identifier of the log entry cannot be found in the error message guide, and upon the determination, comparing the message of the log entry to the error message guide to identify the error resolution that corresponds to the message. The method may include storing the error message guide separate from the plurality of log files.

In another specific embodiment, there is a system for handling logged error messages, the system including a processor-based system executed on a computer system and configured to store an error message guide comprising a plurality of error resolutions, receive a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type, parse the plurality of log files based on the third and fourth attributes to identify a log entry associated with a particular process and a particular message type, compare a message identifier of the log entry with the error message guide to identify an error resolution that corresponds to a message of the log entry, and display the identified error resolution that corresponds to the message on an electronic screen.

In another specific embodiment, there is a computer program product, comprising a non-transitory computer-readable medium having a computer-readable program code embodied therein, the computer-readable program code adapted to be executed by one or more processors to implement a method including storing an error message guide comprising a plurality of error resolutions, receiving a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type, parsing the plurality of log files based on the third and fourth attributes to identify a log entry associated with a particular process and a particular message type, comparing a message identifier of the log entry with the error message guide to identify an error resolution that corresponds to a message of the log entry, and displaying the identified error resolution that corresponds to the message on an electronic screen.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    storing an error message guide comprising a plurality of error resolutions;
    receiving a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type;
    parsing the plurality of log files based on the third and fourth attributes to identify a log entry associated with a particular process and a particular message type;
    comparing a message identifier of the log entry with the error message guide to identify an error resolution that corresponds to a message of the log entry;
    displaying the identified error resolution that corresponds to the message on an electronic screen;
    based on the comparing, determining that the message identifier of the log entry cannot be found in the error message guide; and
    upon the determination, comparing the message of the log entry to the error message guide to identify the error resolution that corresponds to the message.

2. The method of claim 1 comprising:
    receiving from a user a selection of a process; and
    receiving from the user a selection of a message type, the selected process being the particular process, and the selected message type being the particular message type.

3. The method of claim 1 comprising:
    storing the error message guide separate from the plurality of log files.

4. A method comprising:
    storing an error message guide comprising a plurality of error resolutions;
    receiving a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type;
    parsing the plurality of log files based on the third and fourth attributes to identify a log entry associated with a particular process and a particular message type;
    comparing a message identifier of the log entry with the error message guide to identify an error resolution that corresponds to a message of the log entry;
    displaying the identified error resolution that corresponds to the message on an electronic screen;
    filtering the plurality of log entries to identify a subset of similar log entries;
    selecting a single occurrence of a log entry from the subset as being representative of the subset of similar log entries;
    comparing a first message identifier of the selected single occurrence of the log entry with the error message guide to identify a first error resolution that corresponds to a first message of the selected single occurrence of the log entry; and
    displaying on the electronic screen the first error resolution and a count of a number of similar log entries in the subset.

5. A system for handling logged error messages, the system comprising:
    a processor-based system executed on a computer system and configured to:
    store an error message guide comprising a plurality of error resolutions;
    receive a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type;
    parse the plurality of log files based on the third and fourth attributes to identify a log entry associated with a particular process and a particular message type;
    compare a message identifier of the log entry with the error message guide to identify an error resolution that corresponds to a message of the log entry;
    display the identified error resolution that corresponds to the message on an electronic screen;
    based on the comparison, determine that the message identifier of the log entry cannot be found in the error message guide; and
    upon the determination, compare the message of the log entry to the error message guide to identify the error resolution that corresponds to the message.

6. The system of claim 5 wherein the processor-based system is configured to:
    receive from a user a selection of a process; and
    receive from the user a selection of a message type, the selected process being the particular process, and the selected message type being the particular message type.

7. The system of claim 5 wherein the processor-based system is configured to:
    store the error message guide separate from the plurality of log files.

8. A system for handling logged error messages, the system comprising:

a processor-based system executed on a computer system and configured to:

store an error message guide comprising a plurality of error resolutions;

receive a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type;

parse the plurality of log files based on the third and fourth attributes to identify a log entry associated with a particular process and a particular message type;

compare a message identifier of the log entry with the error message guide to identify an error resolution that corresponds to a message of the log entry;

display the identified error resolution that corresponds to the message on an electronic screen;

filter the plurality of log entries to identify a subset of similar log entries;

select a single occurrence of a log entry from the subset as being representative of the subset of similar log entries;

compare a first message identifier of the selected single occurrence of the log entry with the error message guide to identify a first error resolution that corresponds to a first message of the selected single occurrence of the log entry; and display on the electronic screen the first error resolution and a count of a number of similar log entries in the subset.

9. A computer program product, comprising a non-transitory computer-readable medium having a computer-readable program code embodied therein, the computer-readable program code adapted to be executed by one or more processors to implement a method comprising:

storing an error message guide comprising a plurality of error resolutions;

receiving a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type;

parsing the plurality of log files based on the third and fourth attributes to identify a log entry associated with a particular process and a particular message type;

comparing a message identifier of the log entry with the error message guide to identify an error resolution that corresponds to a message of the log entry;

displaying the identified error resolution that corresponds to the message on an electronic screen;

based on the comparing, determining that the message identifier of the log entry cannot be found in the error message guide; and upon the determination, comparing the message of the log entry to the error message guide to identify the error resolution that corresponds to the message.

10. The computer program product of claim 9 wherein the method comprises:

receiving from a user a selection of a process; and receiving from the user a selection of a message type, the selected process being the particular process, and the selected message type being the particular message type.

11. The computer program product of claim 9 wherein the method comprises:

storing the error message guide separate from the plurality of log files.

12. A computer program product, comprising a non-transitory computer-readable medium having a computer-readable program code embodied therein, the computer-readable program code adapted to be executed by one or more processors to implement a method comprising:

storing an error message guide comprising a plurality of error resolutions;

receiving a plurality of log files, each log file having been created by a component of an application program and comprising a plurality of log entries generated by a plurality of processes associated with the application program, each log entry comprising a plurality of attributes, wherein a first attribute specifies a message, a second attribute specifies a message identifier, a third attribute specifies a process, and a fourth attribute specifies a message type;

parsing the plurality of log files based on the third and fourth attributes to identify a log entry associated with a particular process and a particular message type;

comparing a message identifier of the log entry with the error message guide to identify an error resolution that corresponds to a message of the log entry;

displaying the identified error resolution that corresponds to the message on an electronic screen;

filtering the plurality of log entries to identify a subset of similar log entries;

selecting a single occurrence of a log entry from the subset as being representative of the subset of similar log entries;

comparing a first message identifier of the selected single occurrence of the log entry with the error message guide to identify a first error resolution that corresponds to a first message of the selected single occurrence of the log entry; and displaying on the electronic screen the first error resolution and a count of a number of similar log entries in the subset.

\* \* \* \* \*